United States Patent [19]

Pzsolla

[11] Patent Number: 4,688,421
[45] Date of Patent: Aug. 25, 1987

[54] REAR SUPPORT BALANCE FOR AERODYNAMIC FORCE DETERMINATION ON WIND TUNNEL MODELS

[75] Inventor: Hartmut Pzsolla, Gottingen, Fed. Rep. of Germany

[73] Assignee: Deutsche Forschungs- und Versuchsanstalt für Luft-und Raumfahrt e.V., Cologne, Fed. Rep. of Germany

[21] Appl. No.: 785,281

[22] Filed: Oct. 7, 1985

Related U.S. Application Data

[63] Continuation-in-part of Ser. No. 452,719, Dec. 23, 1982, abandoned.

[30] Foreign Application Priority Data

Dec. 28, 1981 [DE] Fed. Rep. of Germany ....... 3151669

[51] Int. Cl.⁴ .......................... G01L 5/16; G01M 9/00
[52] U.S. Cl. .................................. 73/147; 73/862.04
[58] Field of Search ............. 73/147, DIG. 4, 862.04, 73/862.06

[56] References Cited

U.S. PATENT DOCUMENTS

| | | | |
|---|---|---|---|
| 2,918,816 | 12/1959 | Ormond | 73/147 |
| 3,100,990 | 8/1963 | Dimeff | 73/147 |
| 3,306,101 | 2/1967 | Holderer | 73/147 |
| 3,948,089 | 4/1976 | Shaw et al. | 73/776 |

Primary Examiner—Donald O. Woodiel
Attorney, Agent, or Firm—Thomas & Kennedy

[57] ABSTRACT

A rear support balance is utilized for measurement of the six components of the flight mechanics axis system for models mounted in wind tunnels. The balance has a balance body that is inserted between the model and the mounting. The balance body has an action beam 2 and a reaction beam 3 between which piezoelectric measurement pickups are arranged the respective emitted electric charge of which is a measure of the respective component.

4 Claims, 9 Drawing Figures

REAR SUPPORT BALANCE FOR AERODYNAMIC FORCE DETERMINATION ON WIND TUNNEL MODELS

REFERENCE TO RELATED APPLICATION

This is a continuation-in-part of application Ser. No. 452,719 filed Dec. 23, 1982, now abandoned.

TECHNICAL FIELD

This invention relates to devices used to determine aerodynamic forces applied to model aircraft during wind tunnel tests.

BACKGROUND OF THE INVENTION

The invention relates to a rear support balance for measuring the six components of the flight mechanical axis system for aerodynamic force determination on wind tunnel models with a balance body inserted between the model and the mounting and having an action beam and a reaction beam between which are arranged measurement pickups the respective output electrical charge of which is a measure of the respective component.

Models of aircraft, projectiles and land vehicles are conventionally investigated in wind tunnels. A uniform air stream is produced by the wind tunnel and acts on the model. For this purpose, the model is arranged in a measuring section of the wind tunnel. The most frequent type of fastening for the model consists of a round rod known as a rear support which is introduced through the rear of the model and is clamped fast in the fuselage of the model so that the model is carried by it. At the other end, the rear support is received in a mounting by means of which the setting of the model relative to the flow can be varied.

The essential aim of model investigations in wind tunnels is the determination of the aerodynamic force resulting from the flow around the model, and of the moment of the aerodynamic force. Corresponding to the three main axis directions of an aircraft, the aerodynamic force and the aerodynamic force moment can be resolved, corresponding to the flight mechanics axis system, into three mutually perpendicular force components and three moment components about these axes. The determination of these aerodynamic force components is effected with a rear support balance.

The rear support balances used today, of the kind previously described, have a balance body consisting of an action beam and a reaction beam, which are connected by thin, deformable material elements. Strain gauges are mounted in the region of these deformable pieces of material. The aerodynamic forces cause a slight deformation of the deformable material parts and of the strain gauges on them. The strain gauges are arranged in a bridge circuit. Deformations proportional to the forces bring about a detuning of these bridges in which the strain gauges are located. Strain gauges are passive measurement pickups to which, as is known, a supply voltage has to be applied. The voltages arising on deformation, which can be taken off, are approximately linearly proportional to the aerodynamic forces or aerodynamic force moments.

With the known rear support balances, useful measurement results are obtained in stationary flows at constant or only slightly varying measurement temperatures. These balances are particularly suitable for static long-term investigations. Rear support balances operating with strain gauges, however, have available only a low stiffness, dependent on the tangential force element. This often leads to difficulties with the system of model and balance in the case of measurements in the high angle of attack region. The consequences are false measurement results or damage to the balance. For dynamic measurements and for measurements in non-stationary flows, the known balances are of only limited usefulness. Furthermore, local temperature gradients can bring about considerable measurement errors.

GENERAL DESCRIPTION OF THE INVENTION

An object of the invention therefore is to provide a rear support balance of the type described which no longer has the disadvantages of the prior art balances and which, in particular, can be utilized for dynamic and quasi-stationary measurement conditions. The rear support balance is to be usable even for non-stationary flows. The rear support balance is to be far less sensitive to disturbing forces and less liable to destruction and apart from this is to be utilizable equally at high, normal, and cryogenic temperatures.

According to the invention, this is achieved through the use of piezoelectric force pickups positioned at at least two different locations that output at least six signals for the six components. The invention thus utilizes as measurement pickups, not basically passive strain gauges, but active piezoelectric component pickups. Here the known fact is utilized that in certain crystals, when they are compressed or extended in given directions, free charges appear at their surfaces that can be amplified and measured. This effect is reproducible. The advantage can be then made use of that the balance beam no longer has to be made deformably weak, but can advantageously possess high stiffness so that there results a high intrinsic frequency of the model/balance system, which is best suited to pick up the forces which arise, even at large angles of attack, and to measure them without danger of damaging the balance. The piezoelectric force pickups can be constructed as one-component pickups. However, it is particularly advantageous for the piezoelectric force pickups to be constructed as multiple component pickups, in particular as three-component pickups, which are arranged in the balance such that all 6 degrees of freedom of the x, y and z axes are captured. The forming of multiple component pickups, and thus of a pickup which is suitable for picking up and indicating components having different directions, is possible because correspondingly cut and arranged crystals are sensitive to shear. If slices of a quartz crystal, for example, are cut perpendicular to the x-axis, they are sensitive to forces acting in the x-direction. If slices are cut from a quartz crystal perpendicular to the y-axis, they are shear-sensitive.

The beams of the balance body receiving the piezoelectric force pickups between them represent a profile of high stiffness, so that the intrinsic frequency of the balance is as high as possible. The permissible deformations of the balance body thus tend towards zero.

The two beams of the balance body are connected together by means of expanding screws, so that it is possible to exert a prestress on the force pickups. By displacement of the zero point it is possible in this manner also to measure the direction of the forces along an axis and thus their positive or negative sign.

In a preferred embodiment, three three-component pickups are provided between the two beams of the balance body, two of them aligned with the axis of the balance body and one laterally offset from it. The arrangement of the three-component pickups is thus based on the principle of the three-point support. By a corresponding circuit connection of the individual signals which are derivable from the three-component pickups there produces a linear conversion of the six components of the aerodynamic forces into an electric charge proportional to force or moment. The beams of the balance body can have a U-shaped cross section in order to produce the greatest possible stiffness and nevertheless be built compactly.

Further advantages of the new rear support balance exist in that the use of the balance in, for example, liquid nitrogen requires no new calibration of the balance, a single calibration at room temperature being sufficient. Furthermore, the rear support balance possesses a very short response time, a high sensitivity and a high stiffness, for which purpose three different prior art balances would have been needed.

BRIEF DESCRIPTION OF THE DRAWINGS

An example of an embodiment of the invention is shown in the drawing and is described in detail below wherein.

DETAILED DESCRIPTION

Figure 1:
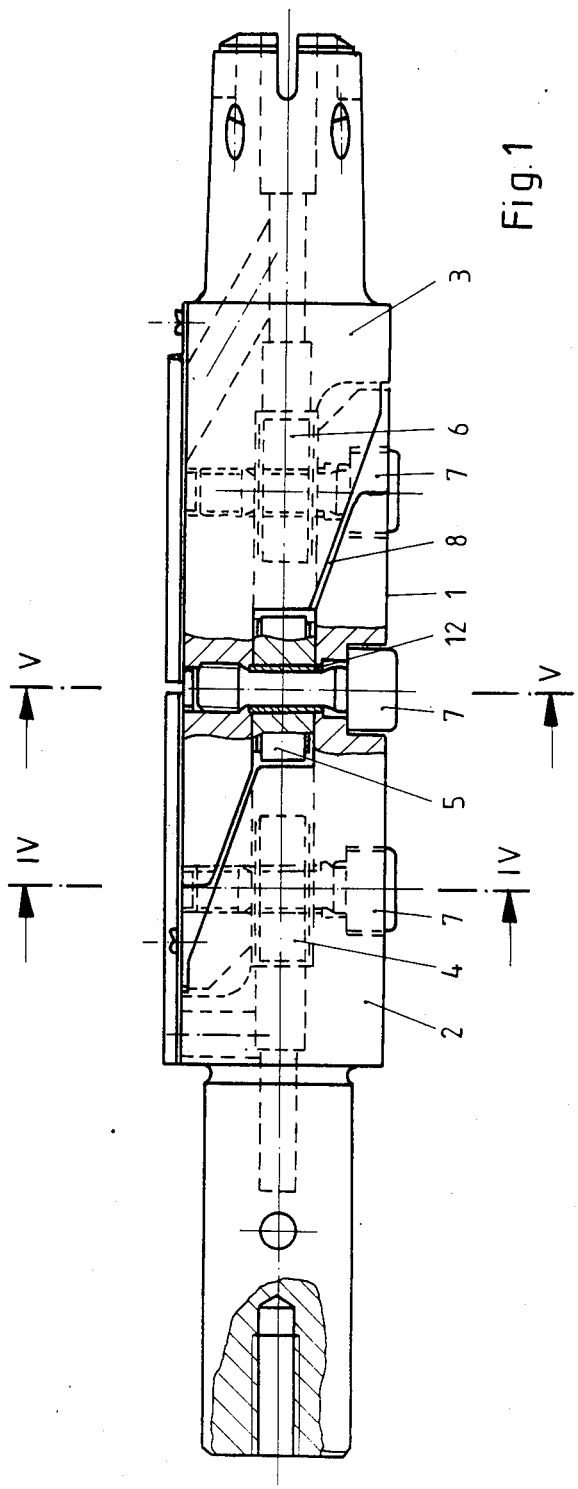
FIG. 1 is a side view of the rear support balance in the assembled state.
Figure 2:
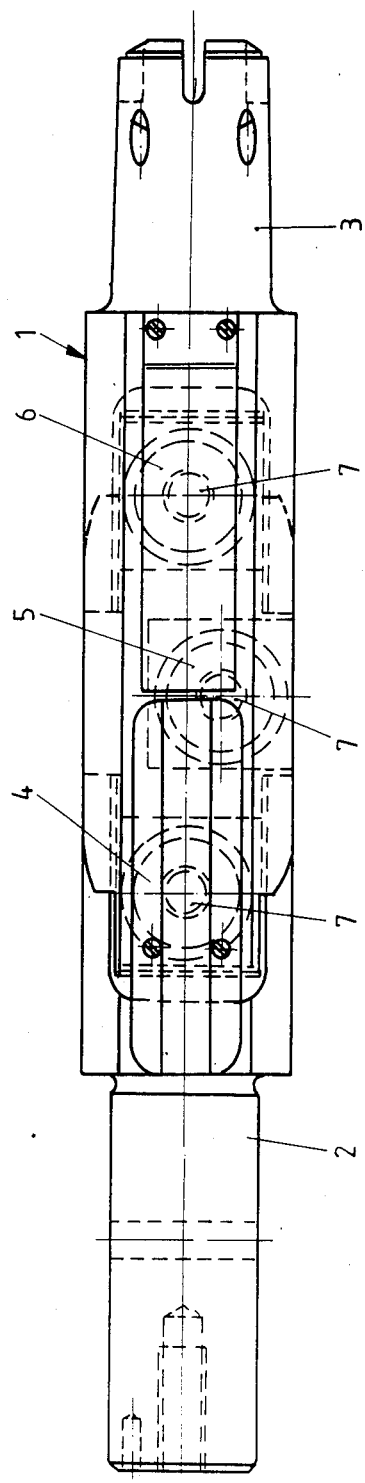
FIG. 2 is a plan view of the rear support balance according to FIG. 1.
Figure 9:
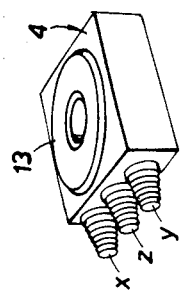
FIG. 9 is a perspective view of one of the three piezoelectric pickup components of the rear support balance.

The rear support balance shown in the figures has a balance body 1 which is composed essentially of an action beam 2 and a reaction beam 3. The two beams are constructed basically similarly and receive between them three three-component pickups 4, 5, 6, which are arranged in one plane, the three-component pickups 4 and 6 being aligned with the axis of the balance while the three-component pickup 5 is arranged laterally offset from it (see FIGS. 2, 3, 5 and 8). The three-component pickups 4, 5, 6 are square and are mounted by means of expanding screws 7 and a centering sleeve 12 between the two beams 2 and 3, and they thus also connect these two beams together. Each of the three-component pickups has three derivable signals corresponding to the flight mechanics axis system x, y, z. Such three-component pickups 4, 5, 6 are commercially obtainable. For example, here, as illustrated in FIG. 9, they are each type 9251A piezoelectric pickups made by Kistler Instruments AG of Winterthur, Switzerland, which generate individual electric signals proportional to mechanical forces applied thereto along x, y and z axes vectorally resolved from a force applied to their sensor element 13. In addition, between the two beams 2 and 3 there is located a through slot 8. Two thin plates, which provide no operative function other than to protect the electric cables from the piezoelectric pickups, are mounted upon the reaction beam 3 only by the fixing screws illustrated in FIG. 1.

Figure 3:
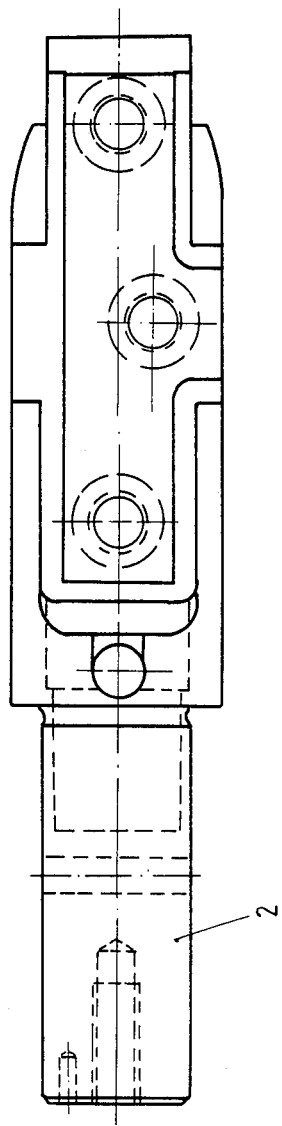
FIG. 3 is a plan view of the action beam of the rear support balance according to FIGS. 1 and 2.
Figure 4:
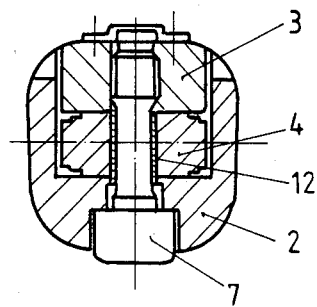
FIG. 4 is a section along line IV—IV of FIG. 1.
Figure 5:
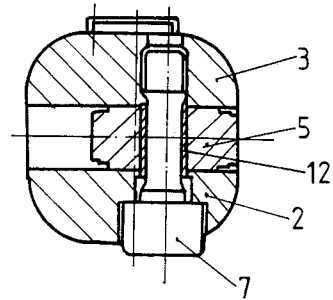
FIG. 5 is a section along line V—V of FIG. 1.

The action beam 2 (and also the reaction beam 3) is formed in the region of the three-component pickups 4 or 6 with a U-shaped cross section, as can best be gathered from FIGS. 3 and 4, so that the construction here is with the greatest possible stiffness in order to set the intrinsic frequency high. The remaining bores, holes, steps and the like formations on the two beams 2 and 3 are of subsidiary importance. They act both to connect the action beams 2 to the model and also to couple the reaction beam to the support, the so-called strut. On the other hand, through holes are provided in order to pass electrical leads through the balance for output of the signals from the three-component pickups 4, 5, 6.

The piezoelectric pickups 4, 5 and 6 are each mounted with their sensor 13 under compression between the action beam 2 and the reaction beam 3. The model is attached to the action beam 2, while the reaction beam 3 is connected to the strut 10. The arrangement of the balance is very stiff and no motion between the beams 2 and 3 can occur. Only the forces on the pickups vary which produce different output signals. Each pickup 4, 5 and 6 has three outputs and produces three output signals according to the three directions x, y, z perpendicular to each other. On each pickup a force is urging against the annular pickup sensor 13 that protrudes slightly out of the square housing of the pickup. This force is divided by the pickup into the three vectoral components of that force, the three independent output signals being equivalent to the three vectoral components of that force. In the event the model is pitched nose down by air flowing through the tunnel, pickup 6 will normally become more compressed in the z-direction while pickup 4 will normally become less compressed in the z-direction. Conversely, should the model pitch nose up pickup 6 will normally become less compressed and pickup 4 more compressed and emit signals indicative of such. From the three x-axis signals of pickups 4, 5, 6 the x-forces acting on the model may be detected and calculated. The same is true for the y-axis forces. Having calculated the three x, y, and z forces the force and the moment of the air exerted on the model can be readily calculated. In the event the model yaws to one side or the other the largest amount in the varying signals will occur with the y signals generated by the three pickups. In the event of roll the signals of pickup 5 will vary greatly since it is positioned off of the longitudinal axis of the balance while pickups 4 and 6 show no appreciable aggregate change in signals.

Figure 6:
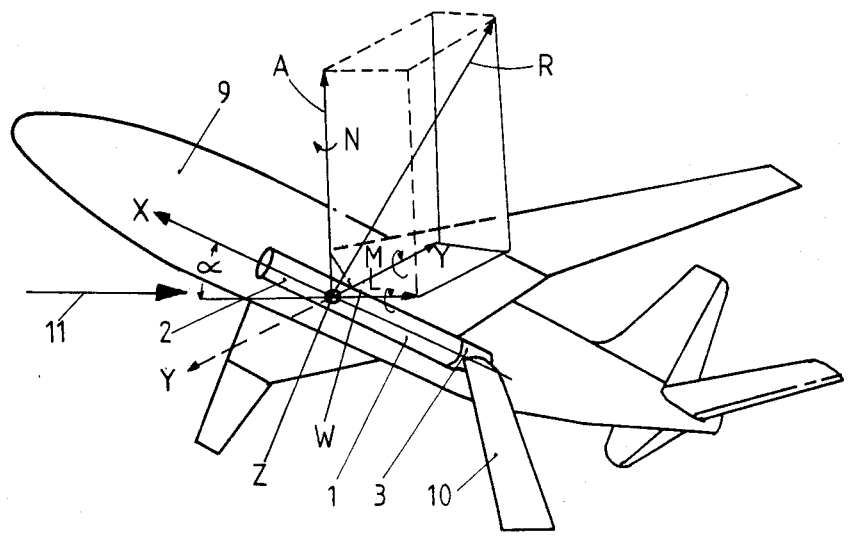
FIG. 6 is a schematic representation of the rear support balance in an aircraft.
Figure 7:
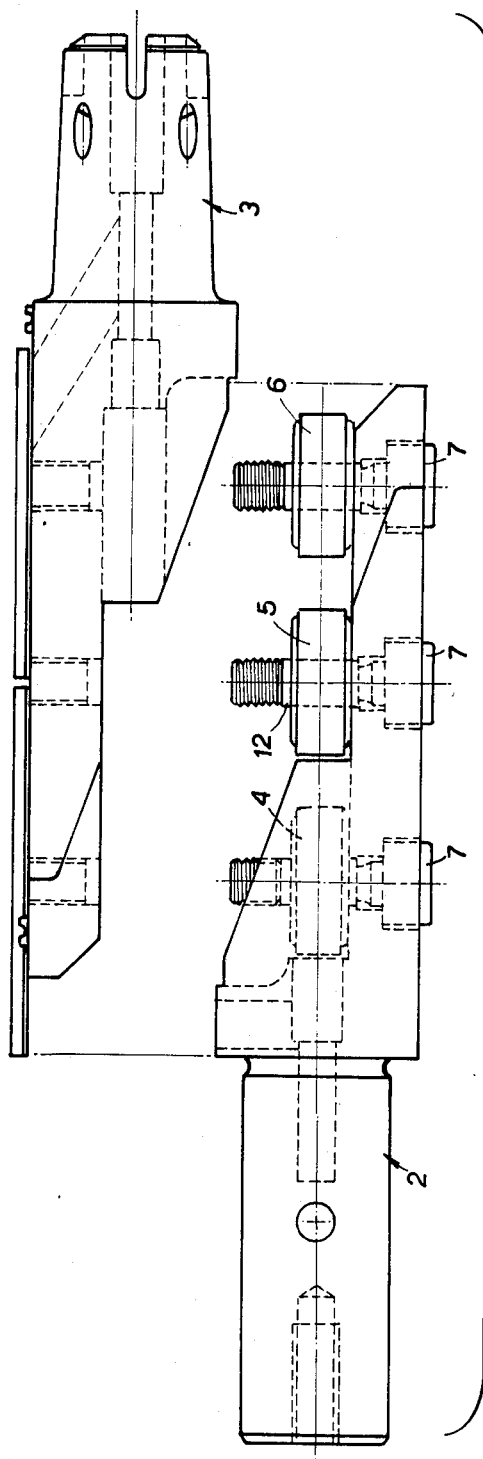
FIG. 7 is a side view of the rear support balance according to FIG. 1 shown in an unassembled state.
Figure 8:
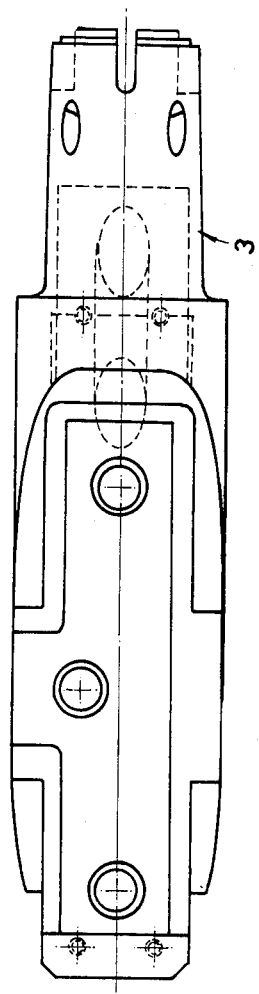
FIG. 8 is a bottom plan view of the reaction beam of the rear support balance according to FIG. 1.

FIG. 6 shows the balance body 1 built into an model aircraft 9. The rear part of the balance body 1, and thus the reaction beam 3, is mounted on the strut 10. At the reference point shown in the region of the balance body, the flight mechancis axis system x, y, z is indicated. It is evident how the flow onto the aircraft model 9 corresponds to the arrow 11 which is set at an angle relative to the x-direction. Finally, the measurement to be determined by means of the rear support balance enables the aerodynamic force R to be determined which results from lift A, resistance W and side forces Y. In addition, the yaw moment N and the roll moment L are indicated for elucidating the pitching moment M.

Let the three-component pickup 4 emit the signals $x_1$, $y_1$ and $z_1$. The signals $y_2$, $z_2$ and $x_2$ come from the three-component pickup 5 while the signals $x_3$, $z_3$ and $y_3$ are generated by the three-component pickup 6. There results for the components of the resulting force vector:

$$Fx = Fy_1 + Fx_2 + Fy_3$$

$$Fy = -Fx_1 + Fy_2 + Fx_3$$

$$Fz = Fz_1 + Fz_2 + Fz_3$$

and for the resulting moment vector M:

$$M = A(Fz_1 - Fz_2)$$

$$N = A(Fx_1 - Fx_3) + B\, Fx_2$$

$$L = B(-z_2)$$

Here, the geometrical distance A is the spacing between the three-component pickup 4 and the three-component pickup 5 in the x-direction. This spacing is equal to the distance between the two three-component pickups 5 and 6 in the x-direction. The distance B corresponds to the lateral offset of the three-component pickup 5 relative to the line joining the two three-component pickups 4 and 6. The signals emitted by the rear support balance are correspondingly amplified and are evaluated in the usual manner.

It should be understood that the just described embodiment merely illustrates principles of the invention in one preferred embodiment. Many modifications, deletions and additions may, of course, be made thereto without departure from the spirit and scope of the invention as set forth in the following claims.

I claim:

1. Apparatus for measuring aerodynamic forces and moments acting on a test model mounted in a wind tunnel, comprising, in combination, an action beam to which a test model may be mounted, a reaction beam adapted to be mounted to a wind tunnel mount and connected by a plurality of expansion screws to said action beam, and at least two piezoelectric force detectors mounted between said action beam to said reaction beam at two spacially separated locations.

2. Apparatus for measuring aerodynamic forces and moments acting on a test model mounted in a wind tunnel, comprising, in combination, an action beam to which a test model may be mounted, a reaction beam adapted to be mounted to a wind tunnel mount, and at least three piezoelectric force detectors mounted between said action beam and to said reaction beam at spacially separated locations and wherein two of said piezoelectric force detectors are mounted along a common longitudinal axis of said beams and the third piezoelectric force detector is mounted offset from said longitudinal axis.

3. Apparatus for measuring aerodynamic forces and moments acting on a test model mounted in a wind tunnel, comprising, in combination, an action beam to which a test model may be mounted, a reaction beam adapted to be mounted to a wind tunnel mount, at least two piezoelectric force detectors mounted between said action beam and to said reaction beam at two spacially separated locations, and wherein a portion of both of said beams is of U-shaped cross section.

4. Apparatus for measuring aerodynamic forces and moments acting on a test model mounted in a wind tunnel, comprising, in combination, an action beam to which a test model may be mounted, a reaction beam adapted to be mounted to a wind tunnel mount, at least two piezoelectric force detectors mounted between said action beam and to said reaction beam at two spacially separated locations, and wherein each of said piezoelectric force detectors is mounted under compression between said action beam and said reaction beam.

* * * * *